US012783276B2

(12) United States Patent
Stinson et al.

(10) Patent No.: US 12,783,276 B2
(45) Date of Patent: Nov. 3, 2026

(54) SERVICE-ORIENTED DATA ARCHITECTURE FOR A VEHICLE

(71) Applicant: Woven by Toyota, U.S., Inc., Palo Alto, CA (US)

(72) Inventors: Jason Stinson, Palo Alto, CA (US); Christopher Heiser, Mountain View, CA (US); Owen Davis, San Francisco, CA (US); Khalid Azam, Fremont, CA (US); Parth Patel, Fremont, CA (US)

(73) Assignee: Woven By Toyota, U.S., Inc., Palo Alto, CA (US)

( * ) Notice: Subject to any disclaimer, the term of this patent is extended or adjusted under 35 U.S.C. 154(b) by 508 days.

(21) Appl. No.: 18/281,435

(22) PCT Filed: Mar. 14, 2022

(86) PCT No.: PCT/US2022/020159
§ 371 (c)(1),
(2) Date: Sep. 11, 2023

(87) PCT Pub. No.: WO2022/192773
PCT Pub. Date: Sep. 15, 2022

(65) Prior Publication Data

US 2024/0152380 A1 May 9, 2024

Related U.S. Application Data

(60) Provisional application No. 63/160,645, filed on Mar. 12, 2021.

(51) Int. Cl.
*G06F 9/455* (2018.01)

(52) U.S. Cl.
CPC .................... *G06F 9/45558* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2009/0260006 | A1 | 10/2009 | Hotra |
| 2015/0026767 | A1 | 1/2015 | Sweet et al. |

(Continued)

FOREIGN PATENT DOCUMENTS

| | | | |
|---|---|---|---|
| EP | 3099019 | A1 | 1/2019 |
| EP | 3671450 | A1 | 6/2020 |

OTHER PUBLICATIONS

International Search Report and Written Opinion of the International Searching Authority issued in corresponding International Patent Application No. PCT/US2022/020159, dated Jun. 16, 2022, 7 pages.

*Primary Examiner* — Eric C Wai
(74) *Attorney, Agent, or Firm* — Christopher G. Darrow; Darrow Mustafa PC

(57) ABSTRACT

System, methods, and other embodiments described herein relate to a service-oriented data architecture within a vehicle. In one embodiment, a computing system for controlling electronic systems of a vehicle includes a system processing unit that executes multiple virtual machines (VMs) to isolate different services of the vehicle. The computing system includes a communication plane spanning between the multiple VMs to provide communications across the multiple VMs and with a mechatronics layer and a sensor layer of the vehicle. The multiple VMs provide the different services by executing microservices that are formed to be self-contained and standardized independent of programmed functions and to interoperate with the communication plane and the multiple VMs.

20 Claims, 11 Drawing Sheets

(56) References Cited

U.S. PATENT DOCUMENTS

| | | | |
|---|---|---|---|
| 2018/0183873 | A1 | 6/2018 | Wang et al. |
| 2018/0293067 | A1 | 10/2018 | Hirshberg |
| 2021/0064409 | A1 | 3/2021 | Onda et al. |

SERVICE-ORIENTED DATA ARCHITECTURE FOR A VEHICLE

CROSS-REFERENCE TO RELATED APPLICATIONS

This application is a U.S. National Stage Non-Provisional Application claiming priority to PCT/US2022/020159, filed Mar. 14, 2022, which claims the benefit of U.S. Provisional Application No. 63/160,645, filed Mar. 12, 2021, which are herein incorporated by reference in their entirety.

TECHNICAL FIELD

The subject matter described herein relates, in general, to systems and methods for a service-oriented data architecture within a vehicle, and, more particularly, to a unique architecture that provides a robust approach leveraging microservice APIs, and a robust communication plane with multiple built-in services to provide a dynamic and robust vehicle computing environment.

BACKGROUND

Technology within vehicles presents many unique difficulties. For example, vehicle systems must be robust against varying conditions while retaining a high level of safety in a mobile platform. Accordingly, various automotive architecture designs generally implement separate elements horizontally within an architecture, and thus generally do not realize efficiencies from the cooperation of resources and simplicity of vertical integration. That is, some traditional architectures include a single layer (i.e., mechatronics) where functionality is added horizontally through the provisioning of additional electronic control units (ECU). Each separate ECU may execute a different proprietary system, and any communications between the ECUs is rudimentary with static programming. This rigid structure relies on updating individual ECUs to make any changes. However, updating the ECUs is a complex task that generally involves service visits to a dealership or other service location. This approach, while robust in some senses, tends to be inflexible. As such, in an age where additional complex functionality is being integrated with vehicles (e.g., automated driving functions, advanced infotainment, etc.) and such functionality benefits or even requires frequent updates, the traditional framework can prove to significantly complicate overall functionality.

SUMMARY

In one embodiment, a computing system for controlling electronic systems of a vehicle is disclosed. The computing system includes a system processing unit that executes multiple virtual machines (VMs) to isolate different services of the vehicle. The computing system includes a communication plane spanning between the multiple VMs to provide communications across the multiple VMs and with a mechatronics layer and a sensor layer of the vehicle. The multiple VMs provide the different services by executing microservices that are formed to be self-contained and standardized independent of programmed functions and to interoperate with the communication plane and the multiple VMs.

In one embodiment, a computing system includes a system processing unit that executes multiple virtual machines (VMs) to isolate different services of a vehicle. The computing system can also include a second processing unit that executes software components that are legacy components of the vehicle. The computing system includes a communication plane spanning between the multiple VMs and the software components to provide communications across the multiple VMs and with a mechatronics layer and a sensor layer of the vehicle. The multiple VMs provide the different services by executing microservices that are formed to be self-contained and standardized independent of programmed functions and to interoperate with the communication plane and the multiple VMs.

In one embodiment, a computing system includes a system processing unit that executes multiple virtual machines (VMs) to isolate different services of a vehicle. The computing system includes a VM manager that executes on the system processing unit and that controls the multiple VMs and arbitrates access to the system processing unit and additional resources of the vehicle. a second processing unit that executes software components that are legacy components of the vehicle. The computing system includes a communication plane spanning between the multiple VMs and the software components to provide communications across the multiple VMs and with a mechatronics layer and a sensor layer of the vehicle. The multiple VMs provide the different services by executing microservices that are formed to be self-contained and standardized independent of programmed functions and to interoperate with the communication plane and the multiple VMs. The microservices are independent applications that integrate with the communication plane. The computing system includes a signal module that executes on one of the multiple VMs, including a vehicle signal model (VSM) that is a hierarchical mapping of signals in the vehicle that arranges the signals according to groups and associates the signals with declarations. The signal module implements logic to execute the declarations, the declarations indicating how to process the signals.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a service-oriented data architecture within a vehicle are disclosed. As previously noted, many vehicle architectures are limited in their ability to adapt because of the rigid form of the horizontal architecture that relies on monolithic applications and specific programming associated with each separate ECU. In general, this approach limits an ability to dynamically configure aspects of the vehicle and to build more powerful system-wide functions due to various constraints of the form of the architecture itself.

Therefore, in one arrangement, an integrated service-oriented data architecture for a vehicle is disclosed that employs a central compute hardware node executing multiple virtual machines managed by a virtual machine manager (e.g., hypervisor) to provide integration with legacy tools and applications while providing a robust and adaptable architecture on top of various existing vehicle systems. For example, in one approach, the disclosed computing system operates on top of a system-on-a-chip (SoC), such as Qualcomm™ Snapdragon™-based processor while coexisting with various mechatronic ECUs, sensors, a microcontroller unit (MCU) of the vehicle, and so on. In any case, the computing system is integrated throughout the existing aspects through the use of a robust communication plane. In general, the use of virtual machines within the computing system avoids a monolithic design and instead provides for adapting and configuring individual components with only modification to those components, thereby providing an improved approach that is more flexible.

Additionally, the use of separate virtual machines provides additional advantages, such as isolation of services/applications associated with functional safety and a robust ability to adapt for future development and shifting of functions into the VMs of the computing system as opposed to being statically integrated with separate ECUs. Moreover, the communication plane provides a robust and efficient mechanism for direct communication between different layers, such as a mechatronic layer and a sensor layer, with the virtual machines and between separate services to facilitate the noted configurability and overall efficiency of the system. In this way, the disclosed computing system improves the data architecture of the vehicle to be more flexible.

Figure 1:
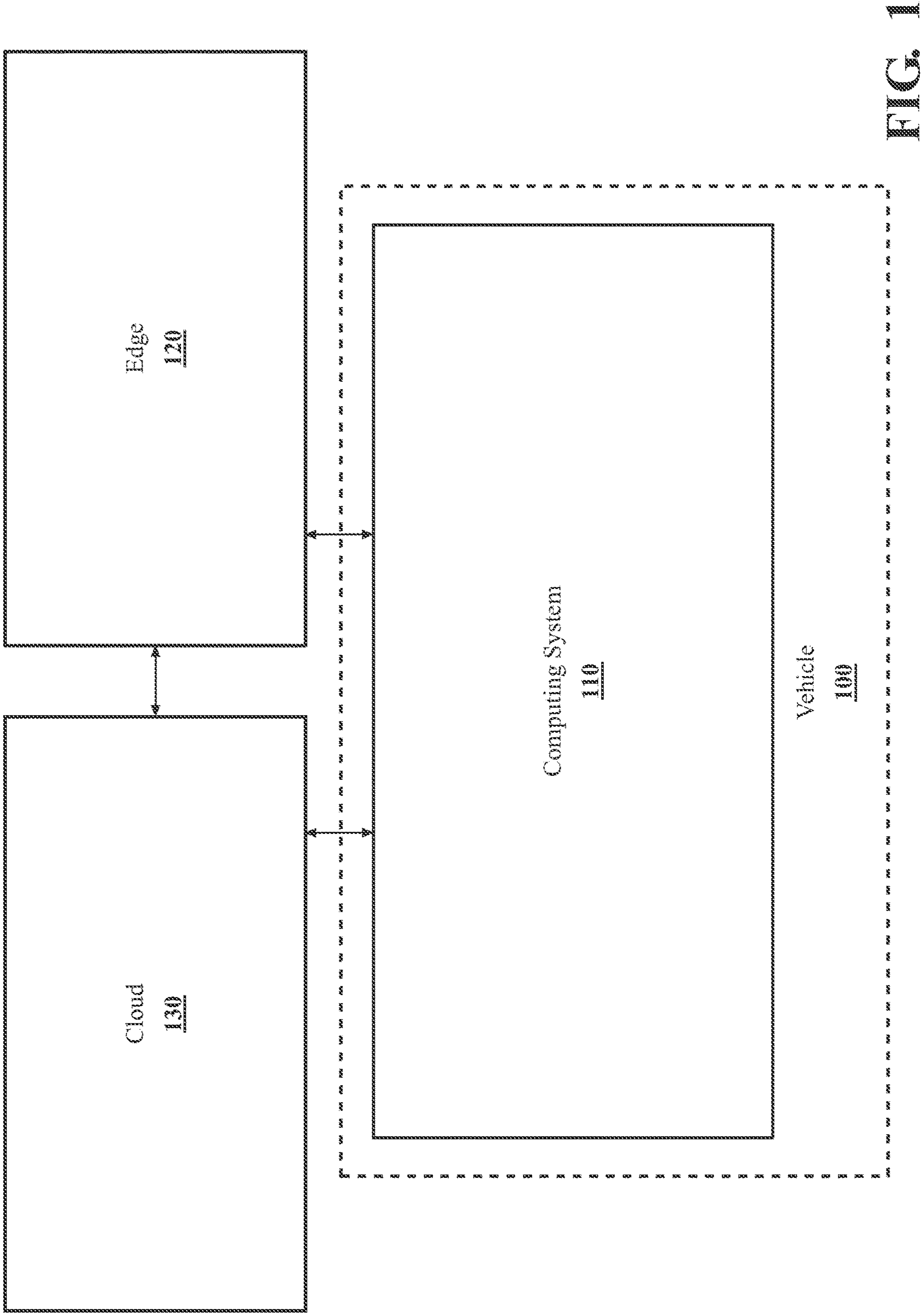
FIG. 1 illustrates one embodiment of a computing system within a vehicle and associated systems that may be remote from the vehicle.

Referring to FIG. 1, an example of a computing environment that includes a vehicle 100 is illustrated. As used herein, a “vehicle” is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device that, for example, includes a similar arrangement of components with similar requirements, and thus benefits from the functionality/configuration of elements discussed herein.

In any case, the vehicle 100 also includes various elements. It will be understood that, in various embodiments, it may not be necessary for the vehicle 100 to have all of the elements described herein. The vehicle 100 can have any combination of the various elements as shown discussed in subsequent figures. Further, the vehicle 100 can have additional elements. In some arrangements, the vehicle 100 may be implemented without one or more of the elements. While Some of the possible elements of the vehicle 100 will be discussed along with FIGS. 1-2, additional aspects will be described along with subsequent figures. However, a description of many of the elements will be provided after the discussion of FIGS. 2-11 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a computing system 110, which, as described herein, includes aspects that form the service-oriented architecture. In various implementations, the computing system 110 includes a system processor (e.g., an SoC) that executes various virtual machines that separately implement different services/applications. Moreover, the computing system, with the virtual machines and other components, implements a communication plane and various APIs that facilitate the functionality described herein. In addition to aspects implemented within the vehicle 100, the overall computing environment also includes an edge 120 and a cloud 130. As described herein, the edge 120 and the cloud 130 may be selectively included as additional remote aspects of the overall computing environment. The noted communications plane can extend to distributed/remote aspects, such as the cloud 130 and/or the edge 120 in order to facilitate additional functionality.

In general, the edge 120 encompasses devices and associated software of road-side units (RSUs), micro-datacenters, and similar components that are located locally to the vehicle 100. That is, the edge 120 represents devices in communication with the vehicle 100 within a local environment, and that may function to perform task offloading for various workloads, such as machine perception, planning, and so on. The cloud 130 includes cloud-based computing resources with applications/services that, in at least one arrangement, function together with the computing system 110 of the vehicle 100 via a shared communication plane. The cloud 130 itself is a remote resource accessed through a wireless communication channel. The cloud 130 may comprise a single device or multiple separate resources that function together to provide functionality. In any case, the cloud 130 integrates with the computing system 110 via the shared communication plane and associated APIs that facilitate interoperability. The noted elements and functions will become more apparent with a further discussion of the figures.

Figure 2:
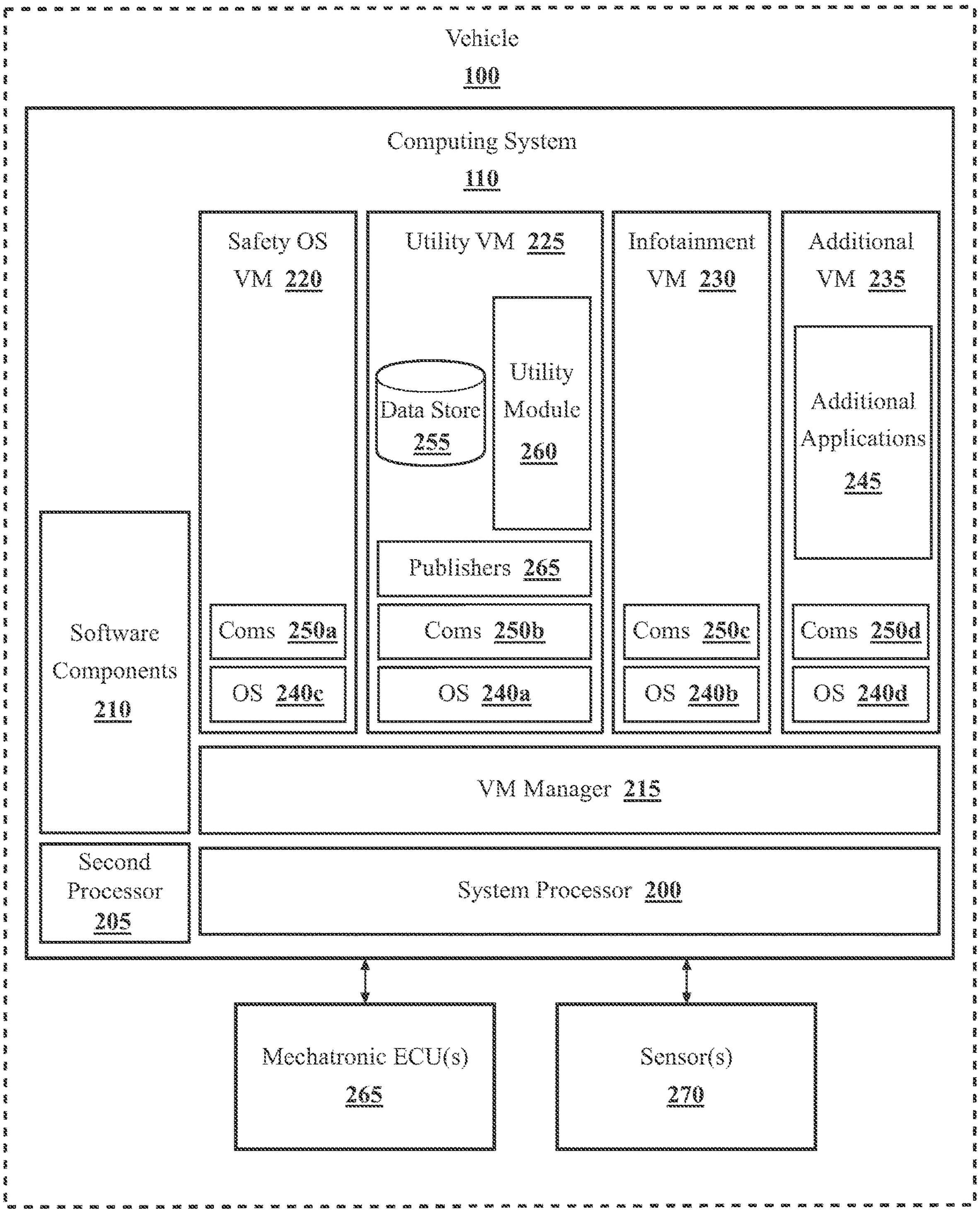
FIG. 2 illustrates one embodiment of the computing system of FIG. 1 in a detailed view.

With reference to FIG. 2, one embodiment of the computing system 110 is further illustrated. The computing system 110 is shown as including a system processor 200. Accordingly, the system processor 200 may be a part of the computing system 110, or the computing system 110 may access the system processor 200 through a data bus or another communication path. In one or more embodiments, the system processor 200 is an application-specific integrated circuit (ASIC) that is configured to implement various functions. In general, the system processor 200 is an electronic processor, such as a system-on-a-chip (SoC) or a microprocessor that is capable of performing various functions as described herein. In one embodiment, the system processor 200 includes, or otherwise accesses, memory that stores various modules that may function in support of the noted aspects herein. The memory may be a random-access memory (RAM), read-only memory (ROM), a hard disk drive, a flash memory, a combination of the noted memories, or other suitable memory for supporting the noted functions. The modules described herein are, in various arrangements, computer-readable instructions that, when executed by the system processor 200, cause the system processor 200 to perform the various functions disclosed herein. In further arrangements, the modules include a logic, integrated circuit, or another device for performing the noted functions that includes the instructions integrated therein.

Furthermore, in one embodiment, the computing system 110 includes a second processor 205, which may be a microcontroller unit (MCU) of the vehicle or another electronic processor. In general, the processor 205 is a legacy device that operates in parallel to the system processor 200. Moreover, while no direct connection is shown, various communication pathways may exist between the system processor 200 and the second processor 205, such as a communication plane comprised of, in one or more approaches, physical layer connections (e.g., Ethernet) with specific software protocols, which will be described in greater detail subsequently. In any case, the second processor 205 executes various software components 210. The software components 210 are, in one configuration, separate binaries and portions of code that the second processor 205 compiles for execution thereon in order to provide different functions in the vehicle 100, which may be legacy functions (e.g., onboard diagnostics, engine management, etc.). Moreover, the software components, in one approach, may further integrate the communication plane, as noted, in order to facilitate communications within the computing system 110.

Continuing with FIG. 2, the system processor 200 executes a virtual machine (VM) manager 215 that controls the separate virtual machine instances 220, 225, 230, and 235. The VM manager is, in one or more arrangements, a hypervisor (also referred to as a virtual machine monitor (VMM)), which functions to manage the execution of the VMs 220-235 by providing a virtualized environment through mediating access to the system processor 200. In this way, the VM manager 215 provides isolated environments for the execution of separate operating system instances. As shown, the VMs 220-235 execute separate operating systems 240*a*, 240*b*, 240*c*, and 240*d*. As a general premise, the separate VMs and associated operating systems focus on different goals and safety requirements within the broader computing environment of the vehicle 100. The operating systems 240*a*-240*d* may include a variety of different operating systems, including real-time operating systems.

In one arrangement, the OS 240*a* is, for example, a Linux™-based operating system. The associated utility VM 225, in one approach, functions to run various non-safety critical applications/services, which can include different functions in support of the service-oriented architecture overall, such as data orchestration, management functions, data storage, event/service discovery, and so on. As a general premise, the VM 225 provides an isolated execution environment in which many of the management and general services discussed herein may operate, as represented by the utility module 260, which is shown as a discrete component for purposes of discussion but is generally formed from a plurality of separate microservices as will be described subsequently.

The OS 240*b* associated with the infotainment VM 230 is, in one embodiment, an Android™-based operating system that functions to control infotainment (e.g., radio, navigation, HVAC controls, etc.) aspects within the vehicle. The OS 240*b* and the VM 230 may further function to control human-machine interface (HMI) elements within the vehicle 100, such as touchscreen displays of the infotainment, and so on. The OS 240*c*, which executes within the safety OS VM 220 is, in one arrangement, a safety-rated operating system (e.g., Unix-based) according to, for example, functional safety standards. The safety OS VM 220 may execute safety-critical applications, such as automated control systems (e.g., ADAS, autonomous control, etc.). FIG. 2 further illustrates an additional VM 235 executing additional applications 245. The additional VM 235 is shown as an exemplary virtual machine in addition to the noted core virtual machines 220-230. That is, the VM manager 215, in various arrangements, can execute a plurality of virtual machines, including the virtual machines that are shown and additional virtual machines that may be associated with different/additional functions than those explicitly recited herein.

As one example, the additional VM 235 may be dedicated to automated controls (e.g., an autonomous driving stack), arbitrating access between different components in the vehicle (e.g., the mechatronics layer 265), and so on. Of course, in further approaches, automated driving (e.g., ADAS, autonomous planning, perception, and control) may include software stacks within one or more of the virtual machines, such as VMs 220 and 225. In any case, as a further example, the additional VM 235 may provide functions related to communicating sensor data via an abstraction layer in the VM manager 215 to the VMs 220-230. That is, for example, the VM 235 may execute a sensor publisher that functions as an intermediate translating layer between the sensors and applications in the VMs 220-230 in order to more efficiently direct sensor data into the applications.

Moreover, while the VM manager 215 is shown as managing entities that interact with the system processor 200, in further aspects, the system processor 200 natively executes a separate operating system independent of the VM manager 215 that, for example, implements various applications, such as safety-critical applications. In any case, execution on the system processor 200 is not limited to the VM manager 215 and associated virtual machines, but rather can support additional instances of other operating systems. Further, the separate operating system(s) outside of the VM manager 215 may further implement an instance a communication plane (e.g., coms 250) to support integration with the overall framework of the computing system 110.

Communication Plane

As shown in FIG. 2, corns 250 is illustrated as multiple separate instances 250*a*, 250*b*, 250*c*, and 250*d* that form the communication plane of the computing system 110. The corns 250 provide seamless communications between various components of the service-oriented architecture. For example, the corns 250 mediate communications between the multiple VMs 220-235 and mechatronic ECUs 265 (also referred to as a mechatronics layer herein) and sensors 270 (also referred to as sensor layer herein). In a further aspect, the corns 250 also mediate communications between different services/applications within the computing system 110 and between the computing system 110 and remote components, such as the cloud 130 and the edge 120.

Figure 3:
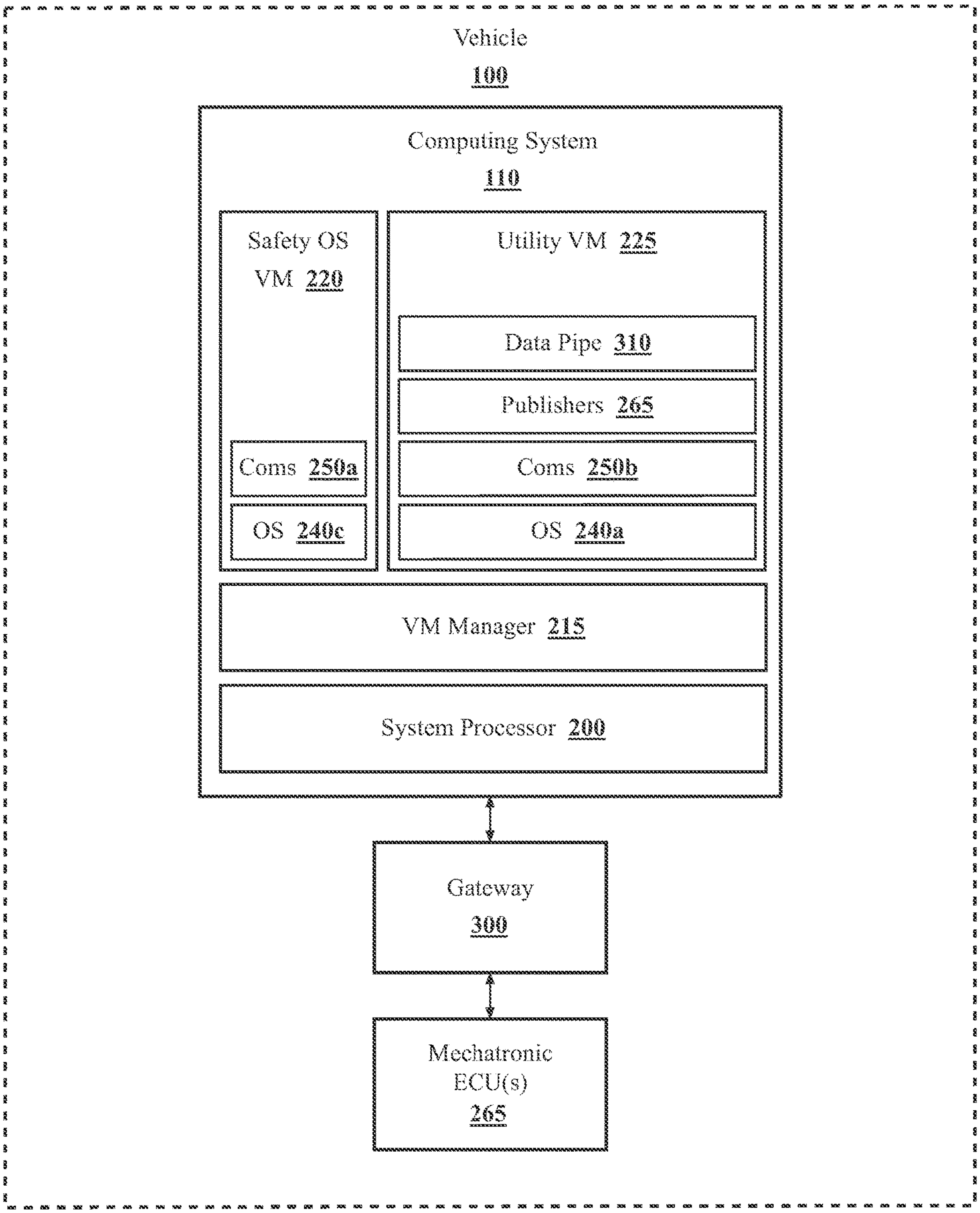
FIG. 3 illustrates one arrangement of an architecture for communicating with a mechatronic layer.

In one arrangement, the computing system 110 segments functionality of the corns 250 into a data plane and a control plane, which are arranged with separate distinctive design elements to facilitate the type of data that is conveyed. Thus, it should be appreciated that depending on the particular implementation of the noted elements, specific components may vary. For example, in one approach, the control plane is comprised of a controller area network (CAN)-Ethernet gateway between the mechatronic ECUs 265 and the computing system 110. The gateway provides isolation between the computing system 110 and the mechatronic ECUs 265 while also consolidating a hardware function of translating between CAN and Ethernet into a single computing device. Furthermore, in one aspect, the gateway uses an adaptive AUTOSAR™ protocol, which is an automotive communication protocol, for transferring the data over Ethernet using multicast (send) and unicast (receive) communications. Accordingly, the VMs of the VM manager 215 can include separate Adaptive AUTOSAR™ Basis modules (not illustrated) to transmit/receive and translate the communications. As shown in FIG. 3, the mechatronic ECU(s) 265 provide CAN data to a gateway 300 that communicates via the VM manager 215 with the VMs.

Figure 4:
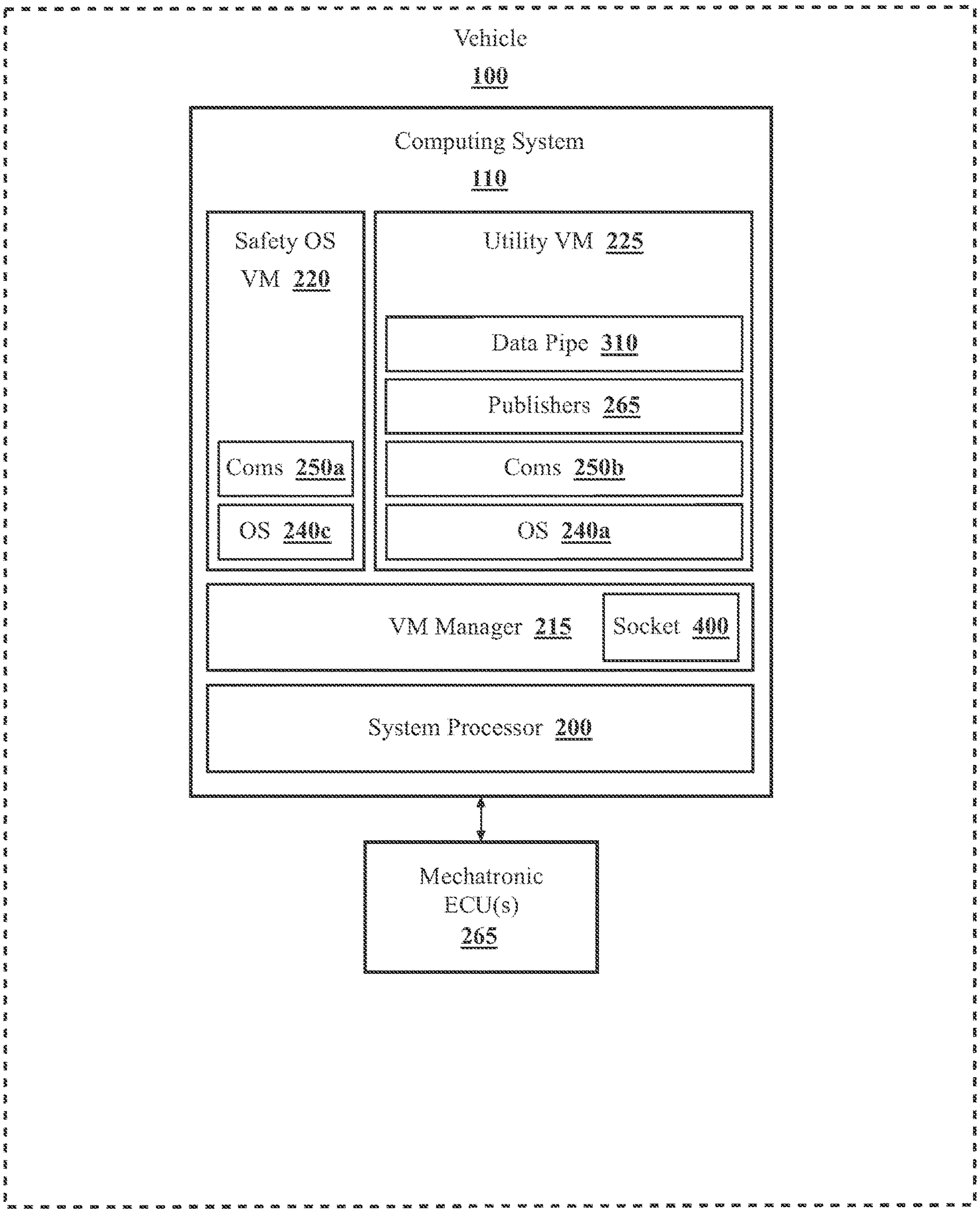
FIG. 4 illustrates another arrangement of an architecture for communicating with a mechatronic layer.

The VMs may implement different approaches to accepting the data from the gateway 300. For example, in one approach, a VM implements an Adaptive AUTOSAR™ Basis module that provides communications either directly to applications/services or through a specific application programming interface (API). Alternatively, a VM can implement a microservice (e.g., publisher 275) that translates communications from and to the Adaptive AUTOSAR™ Basis module. The publisher 275 may further capture information, such as metrics data that is provided to a data pipe 310, and also traceability information for data published back to the CAN bus connected to the mechatronics ECUs 265. An alternative approach is illustrated in FIG. 4, which shows the integration of a socket 400 with the VM manager 215. In this arrangement, the gateway 300 is removed and the mechatronics ECUs 265 communicate directly with the VM manager 215 via the socket 400 to streamline the CAN data path. In general, the VM manager implements the socket CAN 400 and, thus, CAN connections are directly connected with the computing system 110 instead of switching to Ethernet. In this way, the alternative approach improves latency by moving the functionality of the gateway into the VM manager 215 and away from firmware. Accordingly, natively sampling the CAN bus by the publisher 275 provides for improved latency by removing the Adaptive AUTOSAR™ Basis module as a layer in the processing.

In regards to ingestion of data from the sensor 270 via a data plane of the coms 250, it should be appreciated that the sensors 270 generally produce significant quantities of data, which should be handled efficiently by reducing separate transmissions and storing of the data. Accordingly, the physical layer may include a combination of interfaces, including, for example, Ethernet and low-voltage differential signaling (LVDS), which may be used for sensors including radar/LiDAR and cameras, respectively. The computing system 110 implements the coms 250, in one embodiment, as a publisher microservice that is embedded alongside a sensing abstraction layer in the VM manager 215 or separately within a respective virtual machine. That is, in one approach, the data plane of the coms 250 inserts a publishing microservice either alongside the abstraction layer or separately in the VM to eliminate hops through additional processing layers, such as an Adaptive AUTOSAR™ Basis module. This reduces data handling, thereby improving latency.

Figure 5:
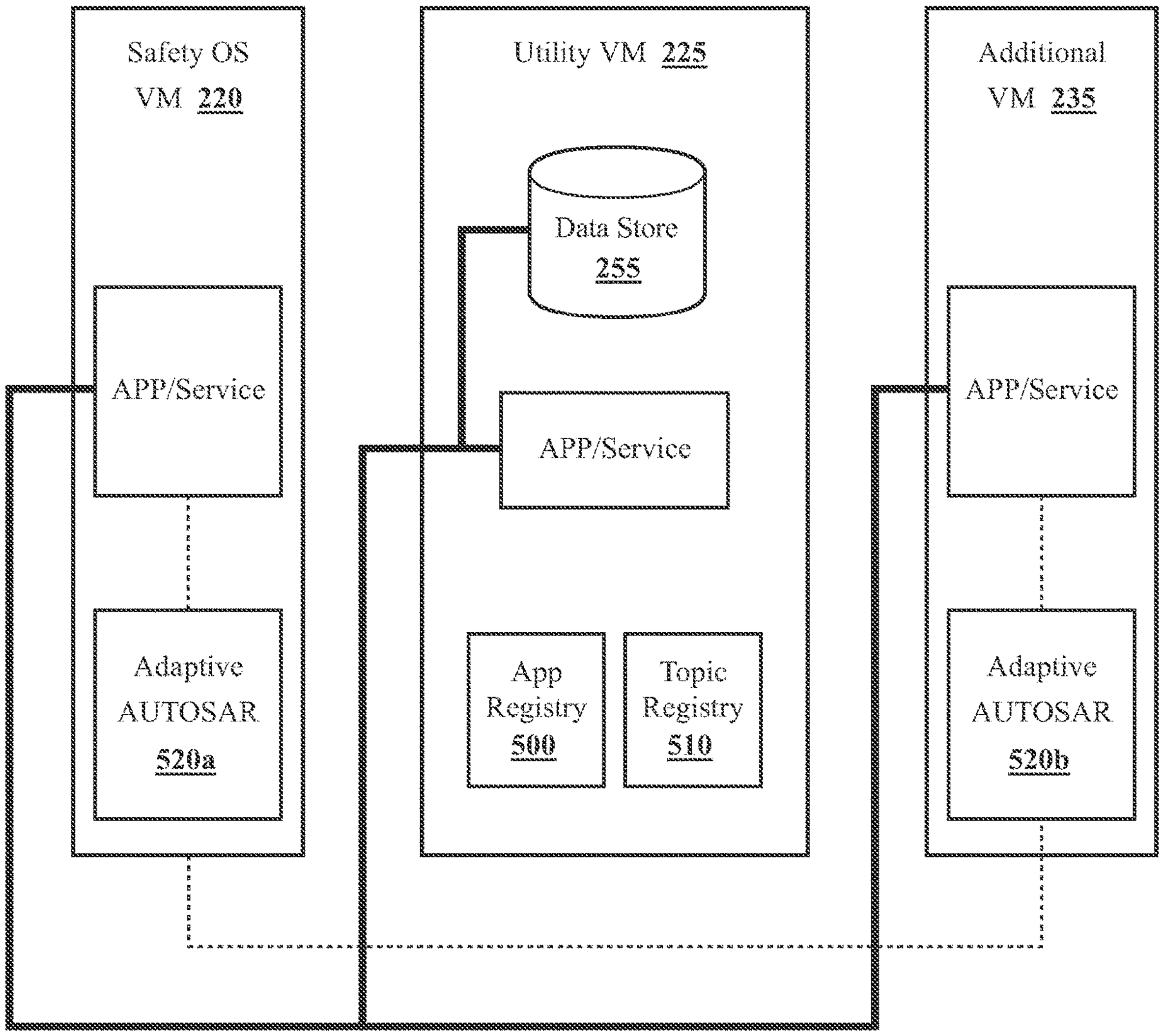
FIG. 5 illustrates an architecture for service-to-service communications between virtual machines.

Regarding service-to-service communications, as an illustrative example, consider FIG. 5, which shows three separate VMs interconnected via the coms 250 (illustrated as a solid black line) and Adaptive AUTOSAR™ (illustrated via the dashed line). In general, the coms 250 provide for service-to-service communications that span both the data plane and the control plane. As will be discussed in greater detail subsequently, the data plane, in one embodiment, implements a peer-to-peer (P2P) approach that is broker-free, whereas the control plane implements a brokered framework. Accordingly, the coms 250 provides for the discovery of services and applications via an app registry 500 and a topic registry 510, which may be separate microservices within the utility module 260. In any case, the control plane implements an event bus service while the data plane utilizes the topics registry 510. The app registry 500 and the topic registry 510 map service ports onto containers and VMs to provide for communications between the services. Moreover, as shown, Adaptive AUTOSAR™ modules 520*a* and 520*b* represent how legacy services can coexist alongside of the communication plane.

As further detail about the separate segments of the coms 250, the data plane represents a communication layer for data flowing between services, applications, and workloads. The data handled by the data plane generally includes data from sensor publishes or services (e.g., CAN data, camera frames, annotation information) and data to actuators or services (e.g., drive-by-wire control message). In one arrangement, the data plane is a P2P network that permits services and applications to establish connections and is not managed or otherwise centrally brokered. This framework for the data plane provides low latency by eliminating additional hops and provides a resilient framework that isolates failures to individual services. Accordingly, the data plane provides for creating dedicated channels between services through the use of topics, thereby isolating traffic to specific functions and facilitating low-latency and topic-specific communication parameters (e.g., quality of service).

As one example, the data plane can establish separate channels for primary data, health, and fault status of a given service to isolate the separate traffic and ensure appropriate communication. Moreover, in one or more arrangements, the form of the data plane includes an abstracted protocol on top of a transport layer in order to make the data plane protocol-agnostic such that the underlying transport layer can be swapped for other technologies without influencing the implementation of the data plane itself. Various transport layer technologies can include, for example, ZMQ™, Data Distribution Service (DDS), etc.

Figure 6:
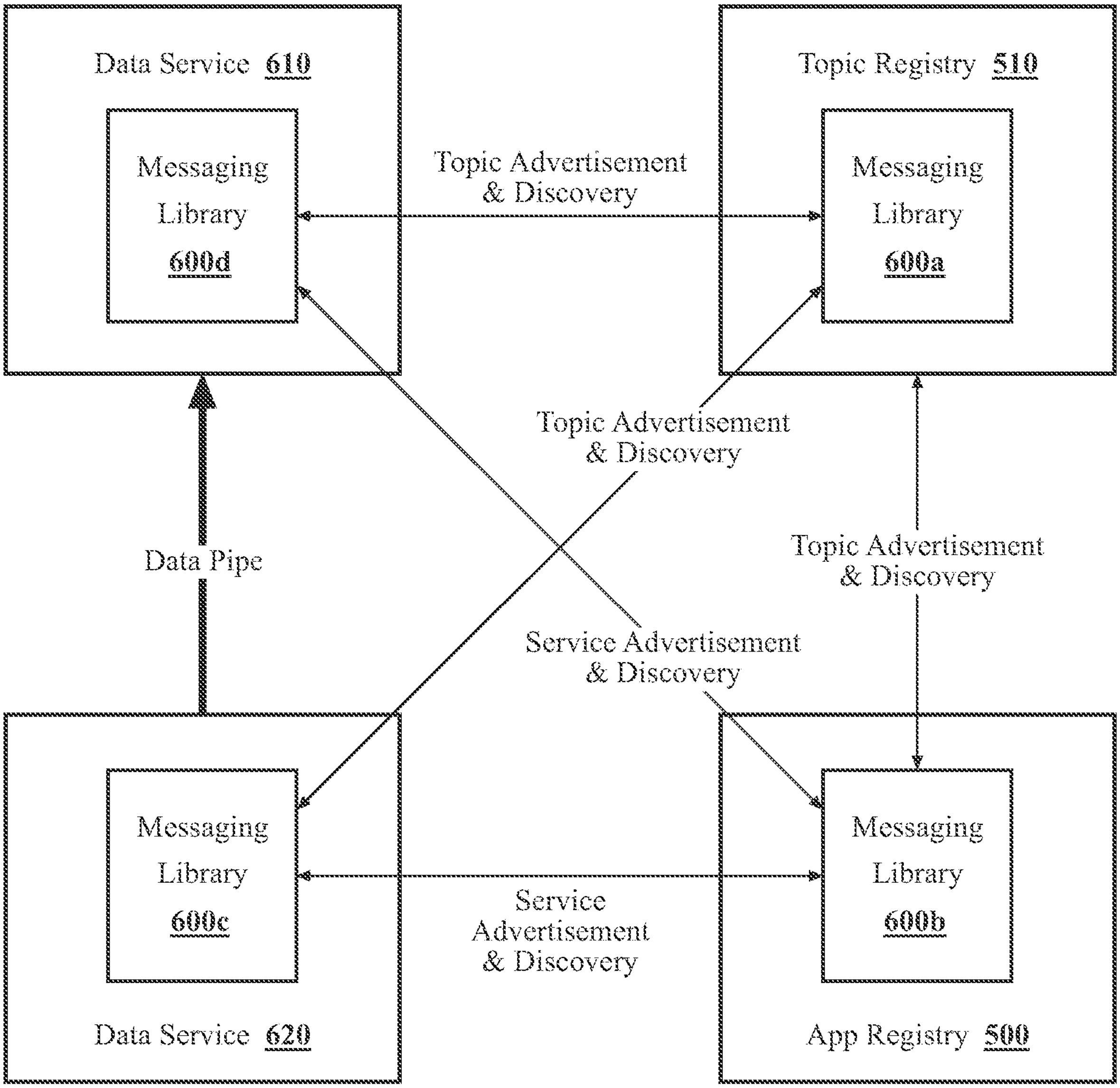
FIG. 6 illustrates an arrangement for application and topic registration and discovery.

FIG. 6 illustrates one example of integrating services (e.g., microservices) with data plane messaging. The messaging libraries 600*a-d* are separate implementation instances of a single library that are included with separate instances of services and with the topic registry 510 and the app registry 500 to facilitate communications on the data plane of the coms 250. In particular, the libraries define a form of communications while the topic registry 510 and the app registry 500 maintain separate indexes of registered apps and topics so that separate microservices, such as data service 610 and data service 620, can discover the apps/topics and initiate communications therebetween. For example, as shown in FIG. 6, the data services 610 and 620 establish a direct P2P connection that functions as a pipeline according to discovery of the corresponding applications within the app registry 500. In this way, the computing system 110 facilitates direct channels between components in a flexible/configurable way.

With further reference to the corns 250, the control plane included therein, is an event-driven architecture for communicating across services (e.g., microservices of separate VMs). In particular, the event-driven architecture of the control plane decouples services since the services, as event consumers, do not need to know about or be coupled with an event producer via prior defined encodings, such as static bindings or APIs. Additionally, the event producer further operates without specific knowledge of the event consumers (e.g., identity, number, etc.) since the consumer is decoupled from the producer via the registries. By forming the relationships in this way, the computing system 110 provides for services to be independently maintained, tested, and upgraded via over-the-air (OTA) mechanisms (i.e., remote wireless control), thereby avoiding impact to other services and tracking specific consumer/producer relationships that may need to be manually updated.

Event Bus

Figure 7:
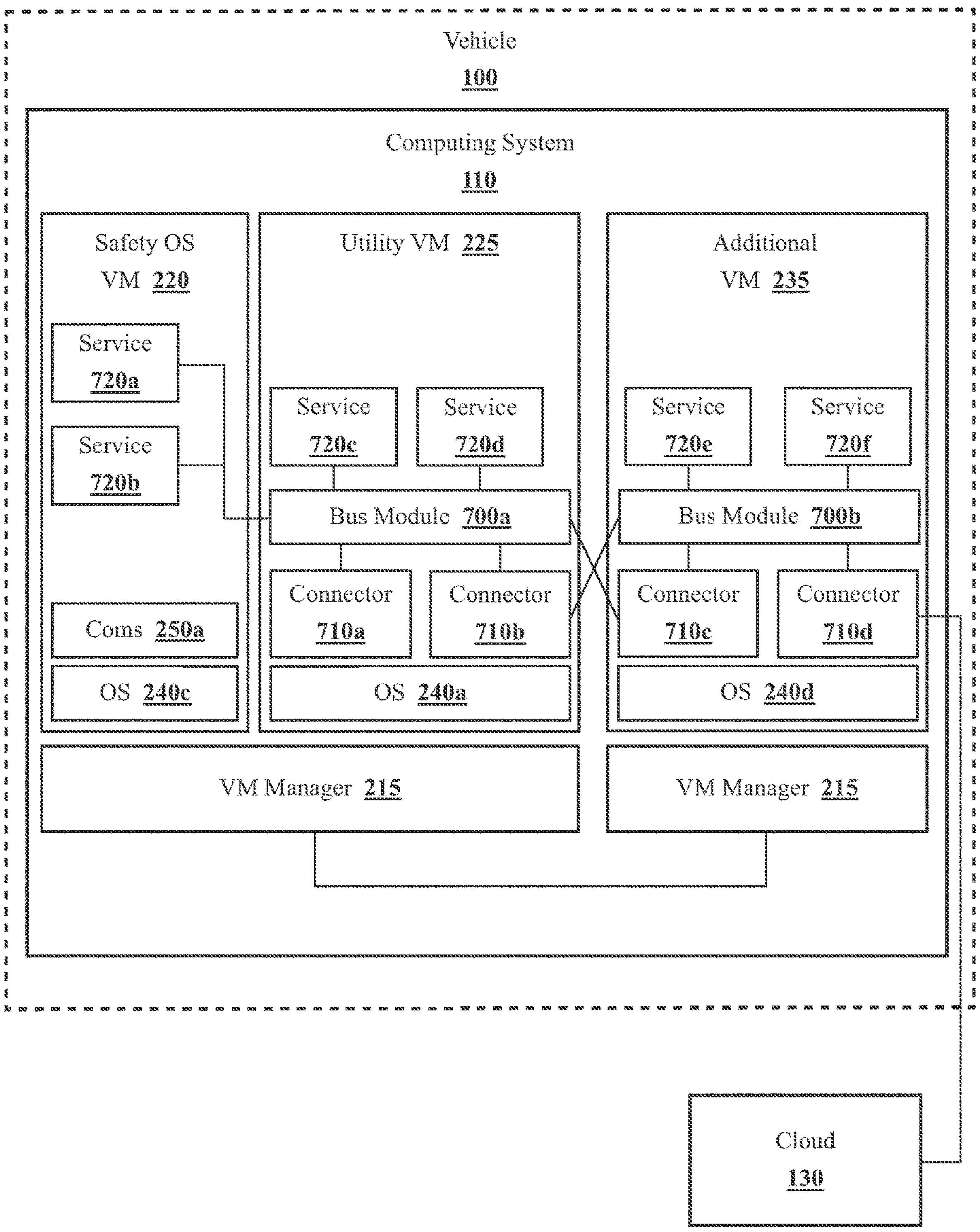
FIG. 7 illustrates one arrangement of a bus module of a communication plane.

Accordingly, in one approach, the control plane implements a bus module 700 within the corns 250, as shown in FIG. 7. In particular, in various arrangements, the bus module 700 (which is shown in FIG. 7 as including multiple instances 700*a* and 700*b* comprised as part of the corns 250) provides a publish-subscribe function to facilitate service-to-service communications. The bus module 700 can be implemented in different forms depending on the implementation. For example, bus module 700, in the context of a single bus for multiple VMs exposes a port externally on the corns 250 to provide services to other VMs, such as is shown in relation to bus module 700*a* and services 720*a* and 720*b* of the safety OS VM 220 in FIG. 7. In further aspects, where multiple instances of the bus module 700 occur, such as with the separate instances of bus module 700*a* and bus module 700*b*, the computing system 110 implements connectors 710*a*, 710*b*, 710*c*, and 710*d*.

The connectors 710 act as bridges that link separate aspects of the computing system 110 and route messages between the separate buses 700*a* and 700*b* or additional buses that may be present. In this way, the bus module 700 is extensible to multiple different VMs. In a further aspect, the connectors 710 forward subscribe messages and may also perform protocol conversion on received messages in order to convert the messages into an appropriate form for the event bus 700. Consequently, in various embodiments, the connectors 710 implement routing tables that relate events, destinations, and protocols with particular destinations to facilitate communication on the corns 250.

Moreover, the connectors 710 may include, in at least one embodiment, additional functionality for connecting the event bus 700 to remote resources, such as cloud 130. Thus, while the cloud 130 may use a different protocol than communications between the VMs, the connector 700*d* can mediate access between the VMs and the cloud 130 by translating the underlying protocols between formats.

Similar to what is shown in FIG. 7, the event bus 700 may span separate processing units and separate VMs. In such an arrangement, messages between separate compute nodes may be routed via the connectors 710. However, messages within the VM manager 215 of the same processor may simply use an exposed port of the event bus 700. In a further example, each separate VM can have a separate event bus 700. In this approach, messages within a VM are handled by a respective event bus 700 while inter-VM messages are handled via the connectors 710 and a single connector (e.g., 710*d*) provides a connection to the cloud 130. In this way, even though the separate services are isolated within separate VMs or other execution environments, communications are provided seamlessly via the event bus 700 and associated connectors without specific individual configuration for each service.

Furthermore, the separate services (e.g., services 720*a, b, c, d, e*, and *f*) are illustrated for purposes of discussion alone. It should be appreciated that the separate VMs can instantiate different numbers of services/applications and are generally not limited to the configuration as shown. The separate services as described throughout this disclosure generally refer to microservices, which will be described in greater detail subsequently. Additionally, while the bus module 700 is described as providing the messages between the separate components, the separate services generally first undertake a process of registration and discovery to establish the separate messages within the coms 250 framework. As previously mentioned in relation to the topic registry 510 and the app registry 500, separate microservices that execute within the VMs register and subscribe in order to operate using the coms 250 within the computing system 110. It should be noted that the registration and discovery apply to both the data plane and the control plane.

Accordingly, in one approach, the utility module 260 of the utility VM 225 implements an event module that can separately comprise services of the app registry 500 and the topic registry 510. The topic registry includes a manifest of ports serviced by different services. Thus, when a service is initiated, the service advertises an associated port to the topic registry 510 as well as discovers ports serviced by other services. Similarly, the app registry 500 is a manifest of services running among a group (i.e., a container or VM). The app registry 500 collects state information of the services that send data to the app registry 500. The state information is available on request to other services, and the app registry 500 also stores the state information in the data store 255 or another data store of the computing system 110. In one approach, the app registry 500 has a dedicated server port that is provided to the topic registry 510 so that services can discover the app registry 500. In this way, the computing system 110 permits services to register and interact with any other service that is also registered. Of course, in various approaches, the event module may arbitrate access according to security and/or other defined policies in the computing system 110. Moreover, services are not required to register and in such a case may still participate in communicating on the communication plane so long as the identifiers of ports for the communicating parties are known, which may occur through direct programming outside of the discovery process.

It should be appreciated that as part of the registration with the event module, the registering service, in one or more approaches, can register, for example, configurable parameters that define events associated with the service to which other services can subscribe in order to facilitate event messages within the coms 250. Moreover, while services are generally discussed within the context of the computing system 110, services that are part of the cloud 130 and the edge 120 may also register and subscribe to services/topics of the event module to provide an event-driven architecture that is extensible across the computing system 110 and beyond (e.g., to cloud and edge assets).

Vehicle Signal Model (VSM)

Figure 8:
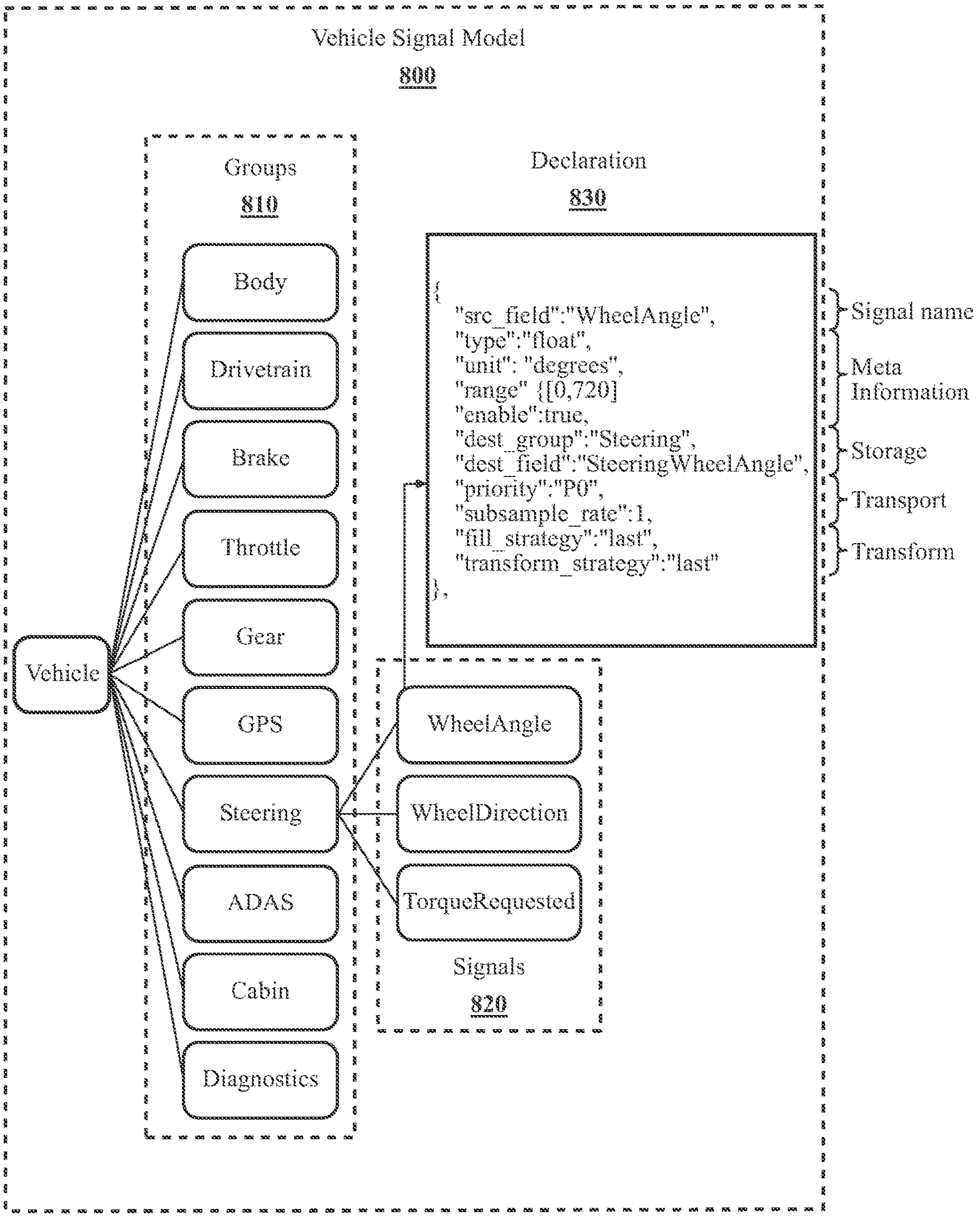
FIG. 8 illustrates a diagram of one example of a vehicle signal model (VSM).
Figure 9:
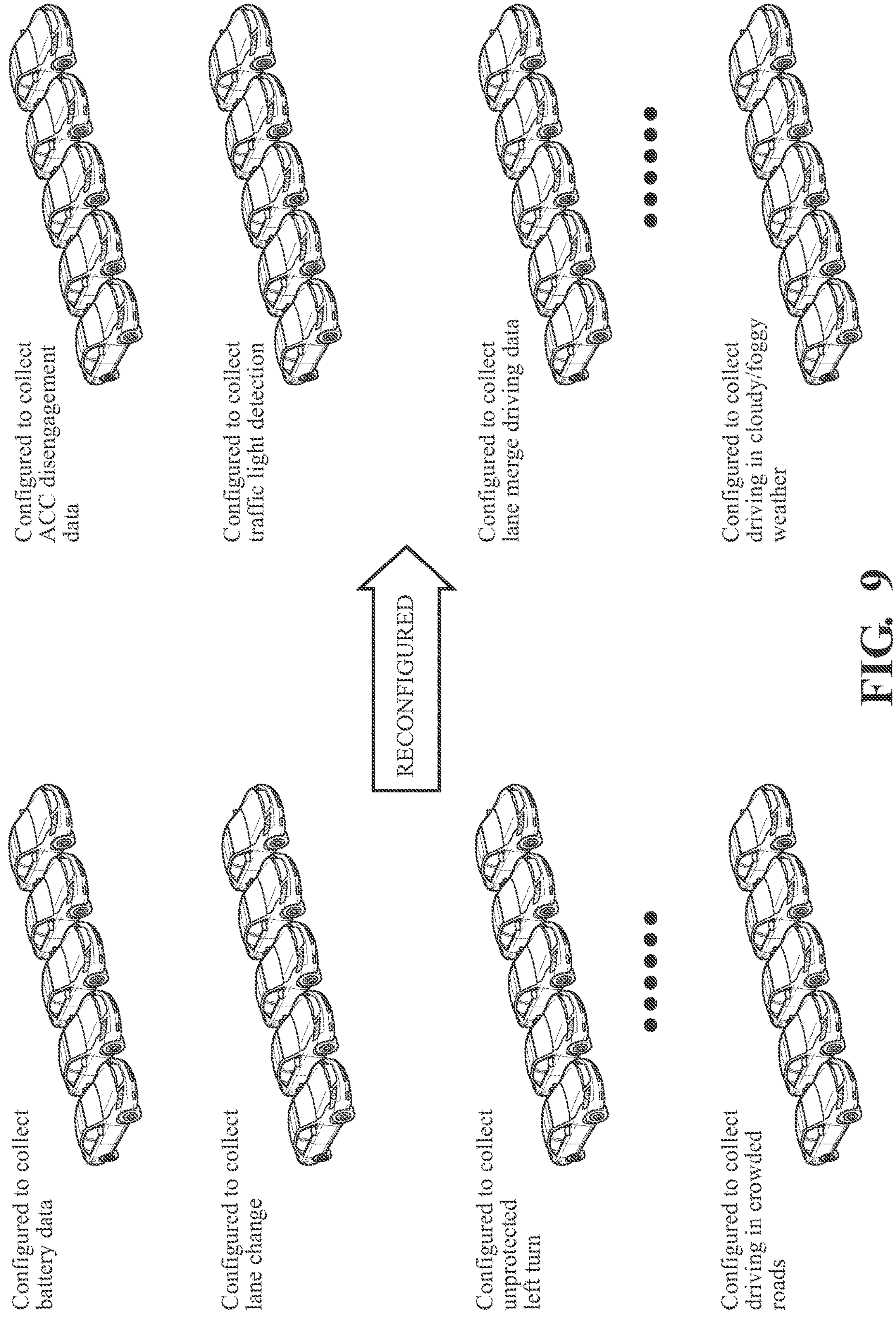
FIG. 9 illustrates one example of the use of a VSM.

Turning to FIG. 8, one example of a vehicle signal model (VSM) 800 is shown. As illustrated, the VSM 800 is comprised of a hierarchical mapping of signals 820 in the vehicle 100 and, in at least one approach, is embodied as a signal module that is a microservice of the utility module 260. The VSM 800 arranges the signals 820 into separate groups 810 that define separate logical divisions/sources within the vehicle 100. The VSM further associates the individual signals 820 with separate declarations 830. The computing system 110 leverages the VSM 800 to filter, prioritize, and manage the signals 820. The separate groups 810 each include a set of signals associated with a particular aspect of the vehicle 100. As shown, the divisions are according to sources of the signals 820. However, the groupings can vary depending on a particular implementation. In any case, the groups 810 are generally consistent across other vehicles of a similar/same configuration that produce the same set of signals 820.

Further, the signals 820 are observable or actionable, and each separate one of the signals 820 has an associated declaration 830 that provides logic about how the computing system 110 is to handle the signal in relation to, for example, service processing, storing or transporting the signal. In further aspects, the VSM 800 may derive from a master VSM (i.e., a master list of all signals) that can provide for validating configuration changes and modeling data flow behavior. The signal module, which is a microservice of, for example, the VM 225 that may be embodied within the utility module 260, functions to create and/or receive VSM filters. The VSM filters define parameters for one or more declarations. In particular, the VSM filters, when implemented by the signal module function to identify particular ones of the signals 820 and to cause execution of a function in relation to processing the identified signal.

For example, the signal module can implement VSM filters for storing particular signals according to selective conditions, such as storing battery parameters when a specific condition (e.g., the temperature is met) occurs. As an additional example, consider FIG. 9, which illustrates an initial configuration of a group of a vehicle and an updated configuration after distributing specific VSM filters to the groups of vehicles. As shown, the VSM filters reconfigure collection of battery data to collection of ACC disengagement data, collection of lane change data to collection of traffic light detection data, collection of unprotected left turn data to collection of lane merge data, and collection of data about driving on crowded roadways to collection of data about driving in cloudy/foggy conditions. In this way, the signal module permits a reconfiguration of how various signals of the vehicle 100 are processed. Moreover, it should be appreciated that while the examples focus on the collection of signal data other functions may also be applied to the signals 820 via the VSM filters.

For example, the signal module, in one or more approaches, uses the VSM 800 to transform signals from the vehicle 100. In one arrangement, the signal module transforms the signal by acquiring the signal and translating (e.g., via a renaming or other modulation) into another form. That is, the signal model may acquire the signal as identified by the VSM 800 and then resend the signal under a different name according to a destination field. As a further example, the signal module, in one arrangement, uses the VSM 800 to perform aggregation of signals. In this regard, the signal module selectively passes a signal defined by the VSM 800 by choosing which iteration (e.g., most recent, every other iteration, etc.) of the signal is passed to other components, averaging the signal (e.g., a moving average over a time window) and providing the average as a value of the signal, and so on. The declaration of the VSM 800 can define this sampling as a fill strategy for how the signal is communicated within the vehicle 100 to different components. Thus, the VSM 800 can define, in one or more approaches, different fill strategies for reporting a particular signal to different components. Moreover, the VSM 800 defines priorities of signals to determine an immediacy of certain actions associated with the signal, such as a priority in communication the signal, storing the signal, processing the signal, and so on. As one example, a signal for a strong braking event (i.e., full amplitude brake signal from a brake pedal) is given higher communication priority than GPS coordinates from a GPS sensor.

Rule Engine

Additional aspects of the computing system 110 provide for further flexibility in adaptively configuring operation. For example, consider the utility module 260 and an additional microservice that defines a rule engine. In one arrangement, the rule engine functions to dynamically define events. For example, the rule engine can acquire an externally-defined rule that is, for example, communicated via the coms 250 from the cloud 130 or another remote entity. Of course, in further examples, the rule that is implemented via the rule engine may be locally derived at the computing system 110. In either case, the externally-defined rule specifies at least a condition for executing at least one of the microservices to alter a behavior of how the at least one microservice functions. The condition may define a particular trigger that is associated with an event, message, or object (e.g., state of the vehicle, sensor data, outside event message, etc.). As a further example, the rule engine may define conditions associated with a state of wireless communicatinos such that, for example, if a high-bandwidth connection is availabe, then more data is offloaded in comparison to a lower-bandwidth cellular connection such that signals are prioritized according to available bandwidth. Whichever condition is defined, the rule further specifies some particular function (e.g., a microservice) that executes in response to triggering the condition. Thus, the rule engine can be employed to adapt behaviors of microservices by adjusting when a particular microservice executes. It should be appreciated that the rule engine, in one or more approaches, can operate on the data plane and the control plane to acquire events and additional information that form the basis of the noted events without any specific integration with the separate services themselves.

As an additional note, the events communicated on the coms 250 between services are, in one or more approaches, composed of an event header and an application-specific payload. The event header captures information for event management, while the application-specific payload is distinct for each separate event type and may be provided in a JSON format. As previously noted, services publish events to the topic registry 510 from which other services can subscribe. The event module provides for adding new events and also removing/modifying existing events. These events are what serve as the trigger for the rule engine to determine when to perform a particular rule. Moreover, the events themselves can be global (e.g., cloud-based), local, or VM specific and because the coms 250 provide the events seamlessly across these entities the integration of the rules is also independent and without specific modification of services. Thus, the rule engine can define the rules according to many different conditions. In general, the rules engine can define wide-ranging rules that alter operation within the system 110, including, but not limited to, management functions, storage, vehicle control, event generation, and so on.

Data Storage

With renewed reference to FIG. 2, the utility module 260 may further include additional microservices associated with data storage and management in the computing system 110. For example, the utility module 260 may further include a microservice that is a storage module. The storage module mediates access between the multiple VMs and a data pipeline. The data pipeline includes multiple different access points for storing different types of data in the computing system 110. For example, in one approach, the data pipeline includes a metrics pipeline, a Blob pipeline, and a logging pipeline. In general, the pipelines are exposed ports associated with microservices of the storage module. Thus, the pipelines handle data access requests to store and retrieve data from data store 255. As such, the storage module registers the pipelines with the topic registry 510.

The metrics pipeline, in one arrangement, provides data to a metrics data store that indexes the data according to time. The metrics data itself is generally structured data about service states, service discovery, system resources monitoring, actuator control messages, metadata for blob data, and log data. The blob pipeline provides data to a blob data store that stores bulk data, such as sensor data, including LiDAR data, camera images, and so on. The metrics data store stores associated metadata and pointers to the bulk data, and wherein storage module stores log data in the metrics data store via the logging pipeline.

The noted data stores are, in one or more approaches, abstracted on top of the data store 255. The data store 255 is, in one embodiment, an electronic data structure stored in a memory that is configured with routines that can be executed by the system processor 200 for analyzing stored data, providing stored data, organizing stored data, and so on. Thus, in one embodiment, the data store 255 stores data used by the microservices of the computing system 110.

In further aspects, the storage module further mediates access between multiple microservices to the data store 255. This mediation allows the microservices to behave/operate independently without affecting other microservices. For example, a microservice reading data from the data store 255 can restart without affecting the service that is storing the data, which would cause conflicts in a monolithic system not implementing microservices. Additionally, the data store 255 allows separation of separate storage locations and what data to communicate out from the separate storage locations. By implementing the data store 255 with this framework, the computing system 110 communicates less data than what is stored, resulting in cost savings. Finally, the data store 255 is implemented with function to fetch data from a past point in time. That is, in general, automotive systems stream data from one service to another without storing that data. In such a case, if an events occurs, it is not possible to identify the data that was generated before the event. Accordingly, the storage module uses the data store to store data via a time index of when the data was generated that permits replay or reinspection of data from a particular point in time, thereby permitting investigation and use of data from any point in the past.

Microservices

Figure 10:
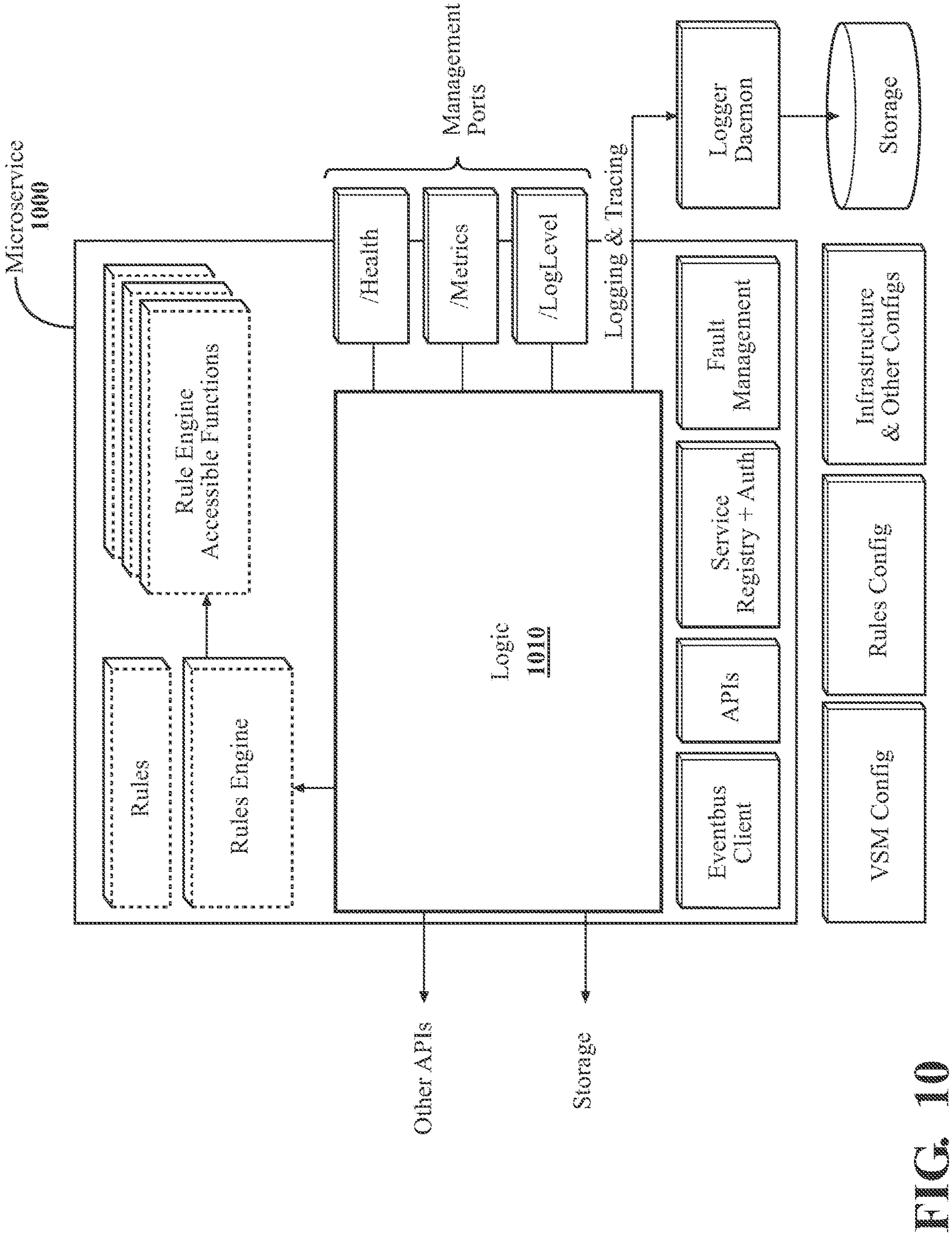
FIG. 10 is a diagram illustrating one example of a microservice configuration.

Turning to FIG. 10, one example of a self-contained microservice 1000 as may be implemented within the multiple VMs of the computing system 110 is shown. In general, the microservices are standardized applications/services in relation to a form of how the microservices are implemented. This standardized form facilitates many aspects of the overall system, such as life cycle, deployment process, monitoring, logging, and so on. As shown in FIG. 10, the microservice 1000 includes various management ports that are standard and include health ports for health checks of the microservice 1000, metrics ports for providing service-related metrics, and loglevel for changing default log and trace levels. The eventbus client provides control plane communications (i.e., coms 250). The microservice 1000 stores logging and tracing information in a common logging component to standardize these processes.

Moreover, service registry and auth provide for enabling service-to-service communications using a common library that permits reusability. A fault management module handles faults in a consistent manner across the microservices by providing consistent management. APIs can be exposed by separate microservices in a consistent manner to facilitate functionality between services.

The rules engine of the microservice is an extension of the rule engine of the utility module 260 that provides for configuration directives to be applied to events from the event bus. By exposing microservice functions via the rules engine, the rules engine can invoke actions of the microservice 1000 based on the rules, including over-the-air updates to individual microservices that avoid any effects on other services through updating the instant microservice alone. The VSM configuration defines a map of all signals in the vehicle 100, thus a standardized mechanism for parsing and processing data by the microservice 1000 via the VSM ensures that the microservice 1000 is only processing data that is valid. Lastly, the logic 1010 includes the primary instructions/logic of the microservice 1000, which can vary from complex machine-learning algorithms to simple data transport instructions.

Tracing

Turning to aspects relating to the cloud 130, the computing system 110, in one arrangement, includes a trace collector. The trace collector receives a trace request that may be provided form the cloud 130 or another entity that specifies aspects associated with the computing system 110 that are to be traced. The trace collector executes the trace request offline in the vehicle 100. That is, the trace collector need not maintain a communication channel with the cloud 130, but can instead locally collect data in a log data store of the computing system 110 according to parameters defined in the trace request. In this way, the trace collector can overcome difficulties with unstable network connections and instead initiates traces at the microservices in the vehicle 100 to track messages defined in the trace request and subsequently offload the collected data when a network is available to the cloud 130.

Figure 11:
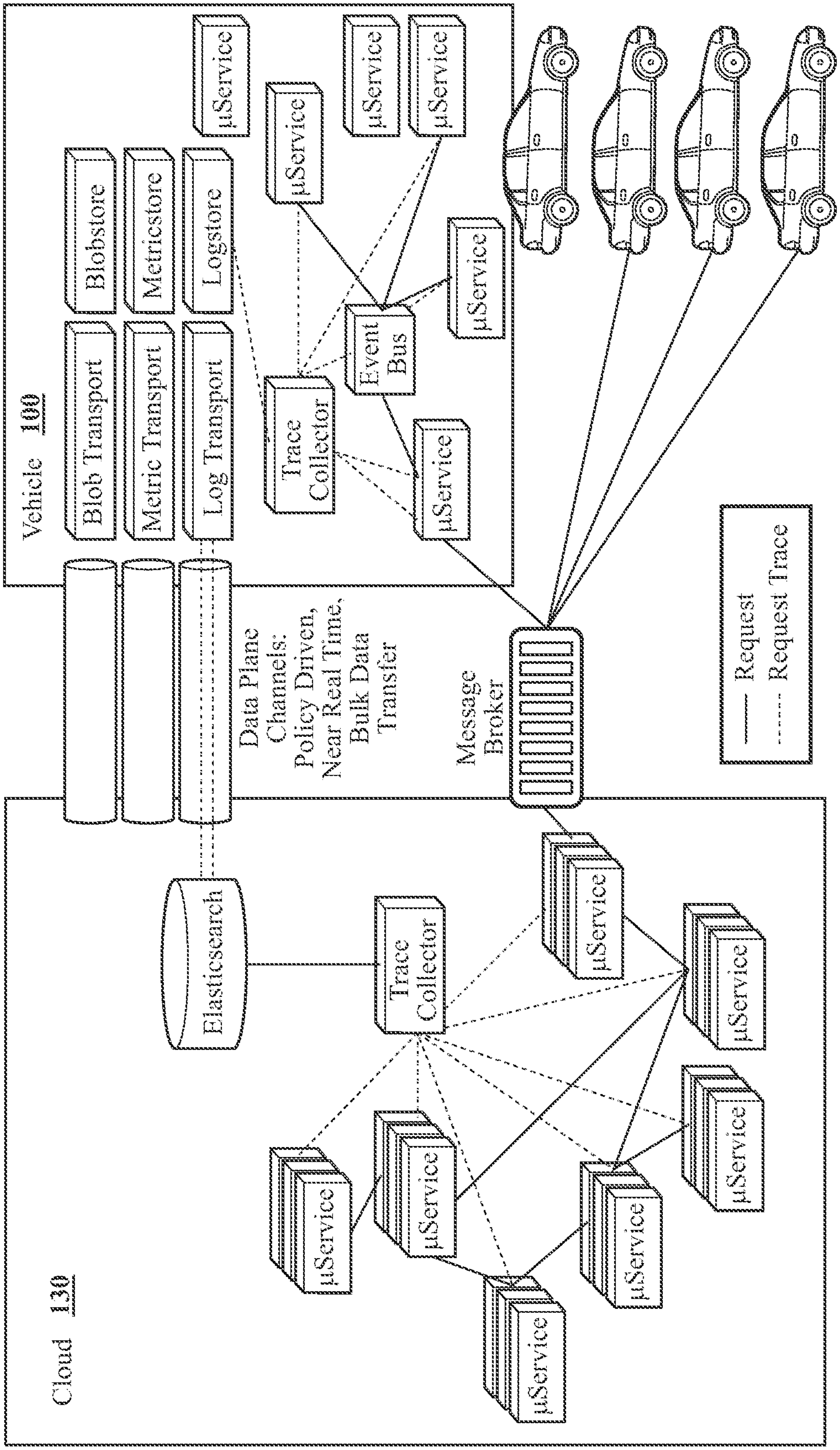
FIG. 11 is a diagram illustrate a tracing process between a vehicle and a cloud.

One example of the trace collector is shown in relation to the vehicle 100 and the cloud 130 in FIG. 11. The local trace collector of the vehicle 100 receives all traces, including traces that originate from the cloud 130 and are bound to a cloud trace collector. The local trace collector adds the traces to the log store and provides the traces to the cloud 130 according to a defined priority that controls the transfer of the traces when the vehicle 100 has a stable communication channel with the cloud 130. The locally stored traces can then be added to other traces from the same request in order to provide a comprehensive trace without the need for a stable end-to-end communication channel. In this way, traces across microservices in a vehicle are local and do not encounter cascading failures or thread lockup due to network issues.

The vehicle 100 of FIG. 1 will now be discussed in full detail as an example environment within which the computing system 110 may operate. In some instances, the vehicle 100 is configured to switch selectively between an autonomous mode, one or more semi-autonomous operational modes, and/or a manual mode. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors, such as system processor 200. In one or more arrangements, the processor(s) can be a main processor of the vehicle 100. For instance, the processor(s) can be an electronic control unit (ECU), microprocessors, SoCs, and so on. The vehicle 100 can include one or more data stores 255 for storing one or more types of data. The data store can be stored within volatile and/or non-volatile memory of the vehicle 100. Examples of suitable memory for the data store 255 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 255 can be a component of the processor(s), or the data store 255 can be operatively connected to the processor(s) for use thereby. The term "operatively connected" and "communicably connected," as used throughout this description, can include direct or indirect connections, including connections without direct physical contact.

In one or more arrangements, the one or more data stores 255 can include map data. The map data can include maps of one or more geographic areas. In some instances, the map data can include information or data on roads, traffic control devices, road markings, structures, features, and/or landmarks in the one or more geographic areas. In some instances, the map data can include aerial views of an area that are capture or derived from various sources. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can be high-definition (HD) map data. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time.

The one or more data stores 255 can include sensor data. In this context, "sensor data" means information derived from the sensors that the vehicle 100 is equipped with, including the capabilities and other information about such sensors. As will be explained subsequently, the vehicle 100 can include the sensors 270 that form a sensor system and that perceive an external environment and aspects about the vehicle 100 itself. As an example, in one or more arrangements, the sensor data can include information from one or more LIDAR sensors, engine monitoring sensors, and so on.

In some instances, at least a portion of the map data and/or the sensor data can be located in one or more data stores 255 located onboard the vehicle 100. Alternatively, or in addition, at least a portion of the map data and/or the sensor data can be located in one or more data stores 255 that are located remotely from the vehicle 100.

As noted above, the vehicle 100 can include the sensor system. The sensor system can include one or more sensors. "Sensor" means an electronic device, component and/or system that can detect, and/or sense aspects of an environment in which the sensor is disposed. The one or more sensors can be configured to detect, and/or sense in real-time. As used herein, the term "real-time" means a level of processing responsiveness that a user or system senses as sufficiently immediate for a particular process or determination to be made.

In arrangements in which the sensor system includes a plurality of sensors, the sensors can work independently from each other. Alternatively, two or more of the sensors can work in combination. In such a case, the two or more sensors can form a sensor network. The sensor system and/or the one or more sensors can be operatively connected to the processor(s), the data store(s), and/or another element of the vehicle 100. The sensor system can acquire data of at least a portion of the external environment of the vehicle 100.

The sensor system can include one or more vehicle sensors. The vehicle sensor(s) can detect, determine, and/or sense information about the vehicle 100 itself. In one or more arrangements, the vehicle sensor(s) can be configured to detect, and/or sense position and orientation changes of the vehicle 100, such as, for example, based on inertial acceleration. In one or more arrangements, the vehicle sensor(s) can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) can be configured to detect, and/or sense one or more characteristics of the vehicle 100. In one or more arrangements, the vehicle sensor(s) can include a speedometer to determine a current speed of the vehicle 100.

Alternatively, or in addition, the sensor system can include one or more environment sensors configured to acquire, and/or sense driving environment data. "Driving environment data" includes data or information about the external environment in which the vehicle 100 is located or one or more portions thereof. For example, the one or more environment sensors can be configured to detect, quantify and/or sense obstacles in at least a portion of the external environment of the vehicle 100 and/or information/data about such obstacles. The one or more environment sensors can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system will be described herein. The example sensors may be part of the one or more environment sensors and/or the one or more vehicle sensors. However, it will be understood that the embodiments are not limited to the particular sensors described. As an example, in one or more arrangements, the sensor system can include one or more radar sensors, one or more LIDAR sensors, one or more sonar sensors, and/or one or more cameras.

The vehicle 100 can include an input system. An "input system" includes a device, component, system, element, or arrangement or groups thereof that enable information/data to be entered into a machine. The input system can receive an input from a vehicle passenger (e.g., a driver or a passenger). The vehicle 100 can include an output system. An "output system" includes a device, component, or arrangement or groups thereof that enable information/data to be presented to a vehicle passenger (e.g., a person, a vehicle passenger, etc.).

The vehicle 100 can include one or more vehicle systems. The vehicle 100 can include a propulsion system, a braking system, a steering system, a throttle system, a transmission system, a signaling system, a navigation system, and so on. Each of these systems can include one or more devices, components, and/or a combination thereof, now known or later developed. Moreover, in general, the computing system 110 functions to communicate with the vehicle systems via a mechatronics layer (e.g., mechatronic ECUs).

The computing system 110 can be operatively connected to communicate with the various vehicle systems and/or individual components thereof. The computing system 110 can be in communication to send and/or receive information from the various vehicle systems to control the movement, speed, maneuvering, heading, direction, etc. of the vehicle 100. The computing system 110 may control some or all of these vehicle systems.

Additionally, the computing system 110 via an automated driving module of one or more of the multiple VMs may be operable to control the navigation and/or maneuvering of the vehicle 100 by controlling one or more of the vehicle systems and/or components thereof. For instance, when operating in an autonomous mode, the processor(s), the computing system 110, and/or the automated driving module 160 can control the direction and/or speed of the vehicle 100. The processor(s), the computing system 110, and/or the automated driving module 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators. The actuators can be any element or combination of elements operable to modify, adjust and/or alter one or more of the vehicle systems or components thereof to responsive to receiving signals or other inputs from the processor(s) and/or the automated driving module. For instance, the one or more actuators can include motors, pneumatic actuators, hydraulic pistons, relays, solenoids, piezoelectric actuators, and so on.

The vehicle 100 can include one or more modules, at least some of which are described herein. The modules can be implemented as computer-readable program code that, when executed by a system processor 200 or another processor, implement one or more of the various processes described herein. One or more of the modules can be a component of the processor(s) itself, or one or more of the modules can be executed on and/or distributed among other processing systems to which the processor(s) is operatively connected. The modules can include instructions (e.g., program logic) executable by one or more processor(s).

The vehicle 100 can include one or more automated driving modules. The automated driving module can be configured to receive data from the sensor system and/or other systems of the vehicle 100. In one or more arrangements, the automated driving module can use such data to generate one or more driving scene models. The automated driving module can determine position and velocity of the vehicle 100. The automated driving module can determine the location of obstacles, or other environmental features, including traffic signs, trees, shrubs, neighboring vehicles, pedestrians, etc.

The automated driving module can be configured to receive, and/or determine location information for obstacles within the external environment of the vehicle 100 for use by the processor(s), and/or one or more of the modules described herein to estimate position and orientation of the vehicle 100 or other data and/or signals that could be used to determine the current state of the vehicle 100 or determine the position of the vehicle 100 with respect to its environment for use in either creating a map or determining the position of the vehicle 100 in respect to mapped/perceived data.

The automated driving module can be configured to determine travel path(s), current autonomous driving maneuvers for the vehicle 100, future autonomous driving maneuvers and/or modifications to current autonomous driving maneuvers based on data acquired by the sensor system, driving scene models, and/or data from other suitable sources. "Driving maneuver" means one or more actions that affect the movement of a vehicle. Examples of driving maneuvers include: accelerating, decelerating, braking, turning, changing travel lanes, merging into a travel lane, and/or reversing, just to name a few possibilities. The automated driving module can be configured to implement determined driving maneuvers. The automated driving module can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module can be configured to execute various vehicle functions and/or to transmit data to, receive data from, interact with, and/or control the vehicle 100 or one or more systems thereof (e.g., one or more of vehicle systems).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A computing system for controlling electronic systems of a vehicle, comprising:

a system processing unit that executes multiple virtual machines (VMs) to isolate different services of the vehicle; and a communication plane spanning between the multiple VMs to provide communications across the multiple VMs and with a mechatronics layer and a sensor layer of the vehicle, wherein the communication plane includes a data plane configured as a peer-to-peer (P2P) network that provides dedicated channels broker-free directly between microservices, wherein the multiple VMs provide the different services by executing the microservices that are formed to be self-contained and standardized independent of programmed functions and to interoperate with the communication plane and the multiple VMs.

2. The computing system of claim 1, wherein the communication plane provides communications between the mechatronics layer, the sensor layer, and the multiple VMs for controlling parameters of the mechatronics layer and the sensor layer and acquiring data from the mechatronics layer and the sensor layer, and wherein the mechatronics layer includes electronic control units (ECUs) to control actuators within the vehicle, and the sensor layer includes electronic sensors of the vehicle.

3. The computing system of claim 2, wherein the communication plane translates communications in a CAN format from the mechatronics layer into the multiple VMs and communications from the sensor layer into the multiple VMs via an abstraction layer in a VM manager.

4. The computing system of claim 1, wherein the communication plane further includes a control plane and the data plane to provide communications directly between components of the multiple VMs.

5. The computing system of claim 4, wherein the data plane provides dedicated channels broker-free between the components of the VMs, and between the components and a sensor layer, and wherein the data plane functions on top of a transport layer of a communication protocol to provide communications between the components.

6. The computing system of claim 4, wherein the control plane is an event-driven communication pathway between the components, and wherein the control plane includes a bus module with separate instances executing within the multiple VMs and linked by connectors between the multiple VMs to transfer the communications, the connectors route the communications.

7. The computing system of claim 6, further comprising:

an event module that executes within a utility VM of the multiple VMs and dynamically registers events on topics from the components from which the components subscribe to the events to provide an architecture for providing communications on the communication plane, wherein the event module registers the events according to configurable parameters that define the events, and wherein the microservices separately define which of the events to receive according to separately defined functions of the microservices.

8. The computing system of claim 7, wherein the events are defined from a group including: global cloud-based components separate from the vehicle, the components within the vehicle, and locally within one of the multiple VMs.

9. The computing system of claim 1, wherein the system processing unit executes a VM manager that controls the multiple VMs and arbitrates access to the system processing unit and additional resources of the vehicle, wherein the microservices are independent applications that integrate with the communication plane, including an infotainment VM, a utility VM, and a safety OS VM, and wherein the multiple VMs execute separate operating systems, including operating systems that are real-time operating systems functioning with timing constraints, safety operating systems that are certified according to a functional safety standard, and high-performance operating systems.

10. The computing system of claim 1, further comprising:

a signal module, including a vehicle signal model (VSM) that is a hierarchical mapping of signals in the vehicle that arranges the signals according to groups and associates the signals with declarations, wherein the signal module implements logic to execute the declarations, the declarations indicating how to process the signals.

11. The computing system of claim 10, wherein the signal module acquires a VSM filter that defines parameters for one or more of the declarations in relation to identified signals of the groups according to the VSM model, wherein the parameters specify changes to at least one function for processing the identified signals, and wherein the at least one function includes a policy that specifies when the signal module executes the function.

12. The computing system of claim 1, further comprising:

a rule engine that dynamically defines events according to an externally-defined rule, wherein the externally-defined rule specifies at least a condition for executing at least one of the microservices to alter a behavior of how the at least one microservice functions.

13. The computing system of claim 12, wherein externally-defined rule updates a configuration of the at least one microservice through altering the behavior.

14. The computing system of claim 1, further comprising:

a storage module that mediates access between the multiple VMs and a data pipeline that includes a metrics pipeline, a blob pipeline, and a logging pipeline, wherein the storage module includes multiple separate ones of the microservices that provide ports for accessing the data pipeline, and wherein the storage module registers the data pipeline with a topic registry.

15. The computing system of claim 14, wherein the metrics pipeline provides data to a metrics data store that indexes the data according to time, wherein the blob pipeline provides data to a blob data store that stores bulk data while the metrics data store stores associated metadata and pointers to the bulk data, and wherein storage module stores log data in the metrics data store via the logging pipeline.

16. The computing system of claim 1, further comprising:

a trace collector that receives, from a cloud-based resource, a trace request, wherein the trace collector executes the trace request offline in the vehicle by collecting data in a log data store of the computing system according to parameters defined in the trace request.

17. The computing system of claim 16, wherein the trace collector initiates traces at the microservices in the vehicle to track messages defined in the trace request, and wherein the trace collector offloads the collected data for the trace request to the cloud-based resource when a network is available.

18. A computing system, comprising:

a system processing unit that executes multiple virtual machines (VMs) to isolate different services of a vehicle;

a second processing unit that executes software components that are legacy components of the vehicle; and a communication plane spanning between the multiple VMs and the software components to provide communications across the multiple VMs and with a mechatronics layer and a sensor layer of the vehicle, wherein the communication plane includes a data plane configured as a peer-to-peer (P2P) network that provides dedicated channels broker-free directly between microservices, and wherein the multiple VMs provide the different services by executing the microservices that are formed to be self-contained and standardized independent of programmed functions and to interoperate with the communication plane and the multiple VMs.

19. The computing system of claim 18, wherein the communication plane provides communications between the mechatronics layer, the sensor layer, and the multiple VMs for controlling parameters of the mechatronics layer and the sensor layer and acquiring data from the mechatronics layer and the sensor layer, and wherein the mechatronics layer includes electronic control units (ECUs) to controller actuators within the vehicle, and the sensor layer includes electronic sensors of the vehicle.

20. A computing system, comprising:

a system processing unit that executes multiple virtual machines (VMs) to isolate different services of a vehicle;

a VM manager that executes on the system processing unit and that controls the multiple VMs and arbitrates access to the system processing unit and additional resources of the vehicle;

a second processing unit that executes software components that are legacy components of the vehicle;

a communication plane spanning between the multiple VMs and the software components to provide communications across the multiple VMs and with a mechatronics layer and a sensor layer of the vehicle, wherein the communication plane includes a data plane configured as a peer-to-peer (P2P) network that provides dedicated channels broker-free directly between microservices, wherein the multiple VMs provide the different services by executing the microservices that are formed to be self-contained and standardized independent of programmed functions and to interoperate with the communication plane and the multiple VMs, and wherein the microservices are independent applications that integrate with the communication plane; and a signal module that executes on one of the multiple VMs, including a vehicle signal model (VSM) that is a hierarchical mapping of signals in the vehicle that arranges the signals according to groups and associates the signals with declarations, wherein the signal module implements logic to execute the declarations, the declarations indicating how to process the signals.

* * * * *